(12) United States Patent
Atarashi et al.

(10) Patent No.: US 7,864,739 B2
(45) Date of Patent: Jan. 4, 2011

(54) TRANSMITTER FOR MULTI-CARRIER TRANSMISSION AND MULTI-CARRIER TRANSMITTING METHOD

(75) Inventors: Hiroyuki Atarashi, Yokohama (JP);
Sadayuki Abeta, Yokosuka (JP);
Noriyuki Maeda, Yokohama (JP);
Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 1022 days.

(21) Appl. No.: 10/437,055

(22) Filed: May 14, 2003

(65) Prior Publication Data
US 2003/0214927 A1    Nov. 20, 2003

(30) Foreign Application Priority Data
May 16, 2002   (JP)   ............... 2002-142114

(51) Int. Cl.
*H04B 7/216*   (2006.01)
*H04B 3/10*    (2006.01)
*H04J 11/00*   (2006.01)

(52) U.S. Cl. ............... 370/335; 370/208; 370/491
(58) Field of Classification Search ............... 370/208, 370/335, 430, 480, 481, 491, 503, 509, 512–515
See application file for complete search history.

(56) References Cited

U.S. PATENT DOCUMENTS

| | | | | |
|---|---|---|---|---|
| 5,982,327 | A * | 11/1999 | Vook et al. | 342/380 |
| 6,359,923 | B1 | 3/2002 | Agee et al. | |
| 6,373,861 | B1 | 4/2002 | Lee | |
| 6,567,374 | B1 * | 5/2003 | Bohnke et al. | 370/203 |
| 6,865,169 | B1 * | 3/2005 | Quayle et al. | 370/335 |
| 6,999,467 | B2 * | 2/2006 | Krauss et al. | 370/441 |
| 7,221,645 | B2 * | 5/2007 | Wang et al. | 370/203 |
| 2002/0159430 | A1 * | 10/2002 | Atarashi et al. | 370/347 |

FOREIGN PATENT DOCUMENTS

| | | |
|---|---|---|
| CN | 1343408 A | 4/2002 |
| EP | 1 128 592 A2 | 8/2001 |
| EP | 1 158 709 | 11/2001 |
| EP | 1 164 733 | 12/2001 |
| EP | 1 178 641 A1 | 2/2002 |
| EP | 1 221 778 A1 | 7/2002 |

(Continued)

OTHER PUBLICATIONS

A. Burg, et al., "FPGA Implementation of a MIMO Receiver Front-end for the UMTS Downlink", 2002 International Zurich Seminar on Broadband Communications, XP-010584388, pp. (8-1)-(8-6).

*Primary Examiner*—Michael T Thier
(74) *Attorney, Agent, or Firm*—Oblon, Spivak, McClelland, Maier & Neustadt, L.L.P.

(57) ABSTRACT

The object of the present invention is to provide a transmitter for multi-carrier transmission for allocating pilot channels to radio frames, in consideration of interference with other pilot channels.

The present invention relates to the transmitter for multi-carrier transmission configured to transmit a plurality of sub-carriers having at least one pilot symbol duration. The transmitter according to the present invention comprises a pilot symbol allocater configured to allocate a plurality of pilot symbol patterns which are orthogonal to each other, to the at least one pilot symbol durations in at least two sub-carriers.

10 Claims, 13 Drawing Sheets

FOREIGN PATENT DOCUMENTS

| | | |
|---|---|---|
| JP | 2000-201134 | 7/2000 |
| JP | 2001-197037 | 7/2001 |
| JP | 2001-203665 | 7/2001 |
| JP | 2001-244913 | 9/2001 |
| KR | 2001-0058248 | 7/2001 |
| WO | WO 01/50655 A1 | 7/2001 |
| WO | WO 01/91318 A1 | 11/2001 |
| WO | WO 02/09334 A1 | 1/2002 |
| WO | WO 03/061170 A1 | 7/2003 |

* cited by examiner

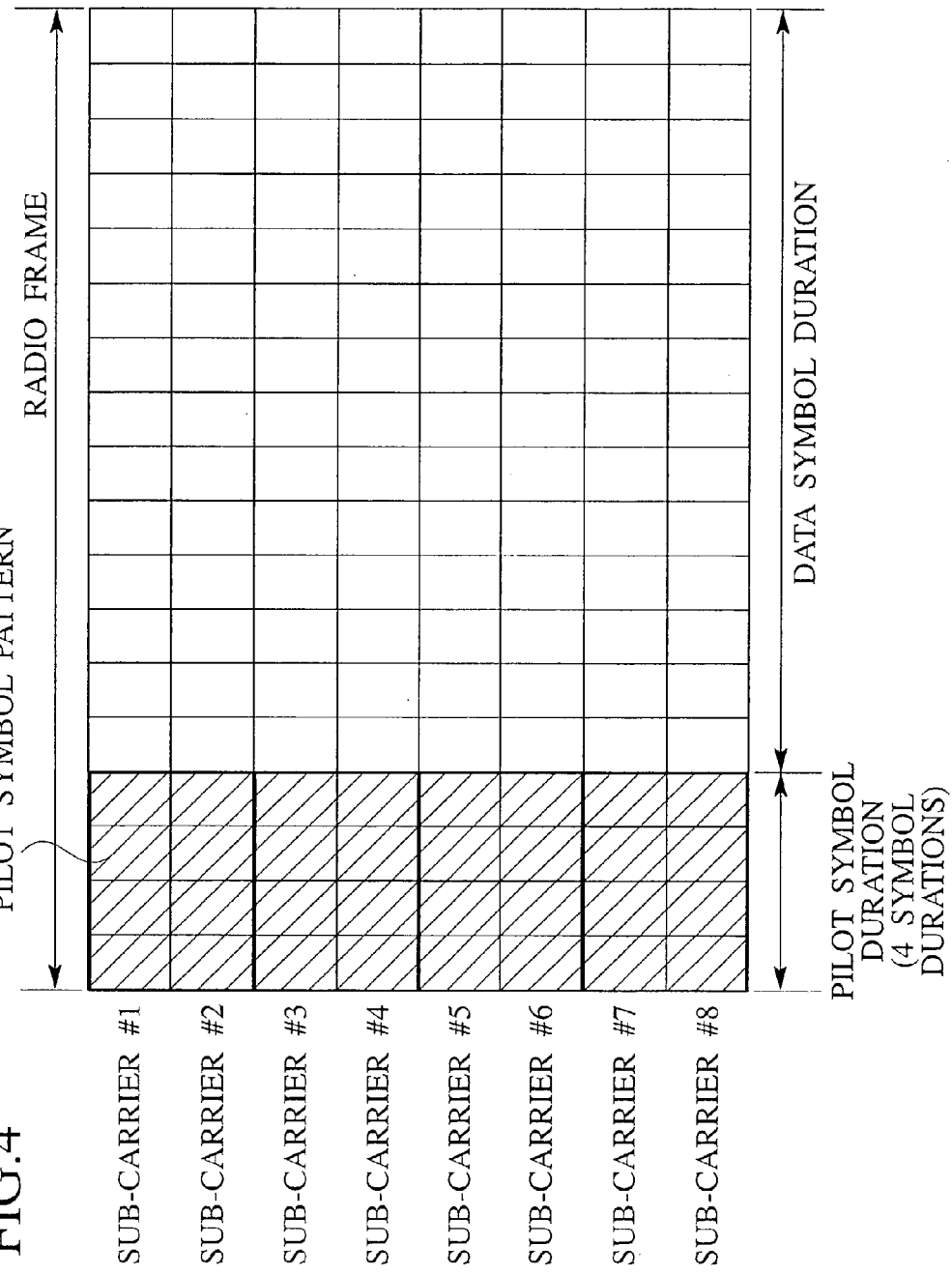

FIG.5

PILOT SYMBOL PATTERN #1

| SUB-CARRIER | SYMBOL DURATION | | | |
|---|---|---|---|---|
| | #1 | #2 | #3 | #4 |
| #i | +1 | +1 | +1 | +1 |
| #i+1 | +1 | +1 | +1 | +1 |

PILOT SYMBOL PATTERN #2

| SUB-CARRIER | SYMBOL DURATION | | | |
|---|---|---|---|---|
| | #1 | #2 | #3 | #4 |
| #i | +1 | −1 | +1 | −1 |
| #i+1 | +1 | −1 | +1 | −1 |

PILOT SYMBOL PATTERN #3

| SUB-CARRIER | SYMBOL DURATION | | | |
|---|---|---|---|---|
| | #1 | #2 | #3 | #4 |
| #i | +1 | +1 | −1 | −1 |
| #i+1 | +1 | +1 | −1 | −1 |

PILOT SYMBOL PATTERN #4

| SUB-CARRIER | SYMBOL DURATION | | | |
|---|---|---|---|---|
| | #1 | #2 | #3 | #4 |
| #i | +1 | −1 | −1 | +1 |
| #i+1 | +1 | −1 | −1 | +1 |

PILOT SYMBOL PATTERN #5

| SUB-CARRIER | SYMBOL DURATION | | | |
|---|---|---|---|---|
| | #1 | #2 | #3 | #4 |
| #i | +1 | +1 | +1 | +1 |
| #i+1 | −1 | −1 | −1 | −1 |

PILOT SYMBOL PATTERN #6

| SUB-CARRIER | SYMBOL DURATION | | | |
|---|---|---|---|---|
| | #1 | #2 | #3 | #4 |
| #i | +1 | −1 | +1 | −1 |
| #i+1 | −1 | +1 | −1 | +1 |

PILOT SYMBOL PATTERN #7

| SUB-CARRIER | SYMBOL DURATION | | | |
|---|---|---|---|---|
| | #1 | #2 | #3 | #4 |
| #i | +1 | +1 | −1 | −1 |
| #i+1 | −1 | −1 | +1 | +1 |

PILOT SYMBOL PATTERN #8

| SUB-CARRIER | SYMBOL DURATION | | | |
|---|---|---|---|---|
| | #1 | #2 | #3 | #4 |
| #i | +1 | −1 | −1 | +1 |
| #i+1 | −1 | +1 | +1 | −1 |

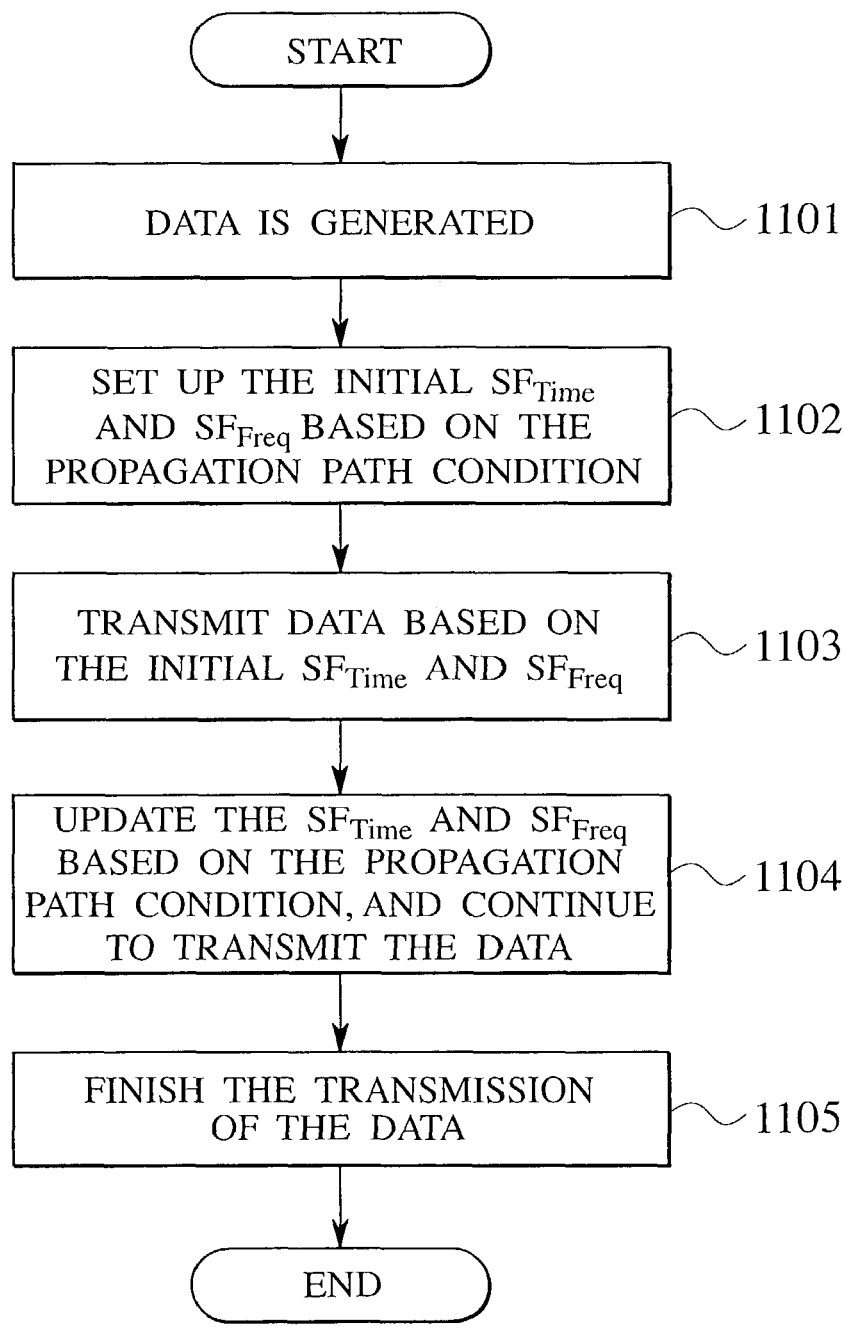

TRANSMITTER FOR MULTI-CARRIER TRANSMISSION AND MULTI-CARRIER TRANSMITTING METHOD

CROSS REFERENCE TO RELATED APPLICATION

This application is based upon and claims the benefit of priority from the prior Japanese Patent Application No. P2002-142114, filed on May 16, 2002; the entire contents of which are incorporated herein by reference.

BACKGROUND OF THE INVENTION

1. Field of the Invention

The present invention relates to a transmitter for multi-carrier transmission and a multi-carrier transmitting method.

2. Description of the Related Art

In recent years, radio transmission systems using multi-carrier transmission have been intensively studied.

For example, "IEEE802.11$a$", which is a standard of wireless LAN, defines a radio transmission system to be performed using OFDM (Orthogonal Frequency Division Multiplexing) which is a simple type of multi-carrier transmission.

Radio access systems such as MC/DS-CDMA (Multi-carrier/Direct sequence-CDMA) and MC-CDMA (Multi-carrier-CDMA) are proposed as radio transmission systems combining the multi-carrier transmission with CDMA (Code Division Multiple Access).

As shown in FIG. 1, spreading code multiplying units $13_1$ to $13n$ spread data symbols using spreading codes, create DS-CDMA signals by arranging (mapping) the spread data symbols (chips) in the time-base, and transmit a plurality of DS-CDMA signals over sub-carriers in parallel, in the MC/DS-CDMA.

As shown in FIG. 2, spreading code multiplying units $13_1$ to $13n$ spread data symbols using spreading codes, arranging (mapping) the spread data symbols (chips) in a plurality of sub-carriers, and transmit the arranged data symbols (MC-CDMA signals) over the sub-carriers in parallel, in the MC-CDMA.

In this way, the reason why radio transmission systems using multi-carrier transmission have been intensively studied is that the multi-carrier transmission has a tolerance to multi-path propagation which is caused by signals transmitting from a transmitter to a receiver via a plurality of propagation paths.

When multi-path propagation occurs, there is a problem in that a delayed signal reaching the receiver can interfere with an earlier received signal.

However, in the multi-carrier transmission, a symbol length becomes longer, and a delay between the early signal (for example, a symbol over the path #1) and the delayed signal (for example, a symbol over the path #L) is smaller than the symbol length as shown FIG. 3. Therefore the influence of interference caused by the multi-path propagation is reduced in the multi-carrier transmission.

Information to be transmitted is overlaid on the amplitude or the phase of the signals transmitted from the transmitter. Therefore the receiver needs to remove any change in amplitude and/or phase which occurred in the propagation paths, and reconstitute the information which is overlaid on the amplitude or the phase.

The method for transmitting symbol patterns (pilot symbol patterns), in which the amplitude and phase are known in the transmitter and the receiver, between the transmitter and the receiver, and estimating the change in amplitude and/or phase which occurred in the propagation paths, are known.

Therefore the configuration of the pilot channel which multiplexes the pilot symbol patterns is very important in the multi-carrier transmission.

Regarding the configuration of the pilot channel in the multi-carrier transmission, the configuration of the pilot channel in the OFDM is disclosed in JP2001-203665, the configuration of the pilot channel in the MC/DS-CDMA is disclosed in JP2001-244913, and the configuration of the pilot channel in the MC/CDMA is disclosed in JP2001-197037.

The above documents disclose the configuration for multiplexing pilot symbol patterns in at least one direction of the time base, the frequencies (sub-carriers) or codes.

The method for spreading data symbols in the direction of the time base and the sub-carriers in two-dimensions, that is to say, the method for spreading data symbols over a plurality of symbol durations in a plurality of sub-carriers is disclosed in "OFDM-CDMA using a method for spreading in the time and frequency domain simultaneously (the technical report RCS-200-3 published by the Institute of Electronics, Information and Communication Engineers)".

However, the conventional configuration of the pilot channel has a problem in that the influence of the interference between the pilot channels multiplexed on the radio frames is not considered.

The conventional method for spreading the data symbols in at least one direction of the time base or the sub-carriers has a problem in that the merit of the signal transmission characteristics in each method greatly depends on the condition of the propagation paths.

BRIEF SUMMARY OF THE INVENTION

In viewing of the foregoing, it is an object of the present invention to provide a transmitter for multi-carrier transmission and a multi-carrier transmitting method for allocating pilot channels to radio frames, in consideration of interference with other pilot channels.

It is another object of the present invention to provide a transmitter for multi-carrier transmission and a multi-carrier transmitting method for controlling the spreading method, in consideration of the condition of the propagation paths between the transmitter and a receiver, for multi-carrier transmission.

A first aspect of the present invention is summarized as a transmitter for multi-carrier transmission configured to transmit a plurality of sub-carriers having at least one pilot symbol duration comprising a pilot symbol allocater configured to allocate a plurality of pilot symbol patterns which are orthogonal to each other, to the at least one pilot symbol durations in at least two sub-carriers.

In the transmitter for multi-carrier transmission, the pilot symbol allocater preferably changes the length of a pilot symbol pattern based on the number of the pilot symbol patterns which are allocated.

In the transmitter for multi-carrier transmission, the pilot symbol pattern is preferably configured with an orthogonal Variable Spreading Factor (OVSF) code.

In the transmitter for multi-carrier transmission, the pilot symbol allocater preferably allocates the pilot symbol patterns to any given portion in the at least one pilot symbol durations in at least two sub-carriers. The pilot symbol patterns which are allocated to the same portion are orthogonal to each other.

In the transmitter for multi-carrier transmission, the pilot symbol allocater preferably allocates the pilot symbol patterns to the at least one pilot symbol durations in predetermined numbers of consecutive sub-carriers.

A second aspect of the present invention is summarized as a transmitter for multi-carrier transmission configured to transmit a plurality of sub-carriers having a plurality of symbol durations comprising spreaders and a controller. The spreaders are configured to spread and transmit symbols over the symbol durations in a plurality of sub-carriers, using sub-carrier spreading factor assigned in the direction of the sub-carriers and time-base spreading factor assigned in the direction of the time base. The controller is configured to change the sub-carrier spreading factor or the time-base spreading factor, based on the condition of a propagation path between the transmitter and a receiver for multi-carrier transmission.

In the transmitter for multi-carrier transmission, the controller preferably changes the sub-carrier spreading factor or the time-base spreading factor when a radio channel is set up between the transmitter and the receiver.

In the transmitter for multi-carrier transmission, the controller preferably changes the sub-carrier spreading factor or the time-base spreading factor, following a change in the condition of the propagation path.

A third aspect of the present invention is summarized as a multi-carrier transmitting method for multi-carrier transmission for transmitting a plurality of sub-carriers having at least one pilot symbol duration comprising: allocating a plurality of pilot symbol patterns which are orthogonal to each other, to the pilot symbol durations in at least two sub-carriers.

In the multi-carrier transmitting method, the length of a pilot symbol pattern is preferably changed based on the number of the pilot symbol patterns which are allocated.

In the multi-carrier transmitting method, the pilot symbol pattern is preferably configured with an orthogonal Variable Spreading Factor (OVSF) code.

In the multi-carrier transmitting method, the pilot symbol patterns are preferably allocated to any given portion in the pilot symbol durations in at least two sub-carriers. The pilot symbol patterns which are allocated to the same portion are orthogonal to each other.

In the multi-carrier transmitting method, the pilot symbol patterns are preferably allocated to the pilot symbol durations in predetermined numbers of consecutive sub-carriers.

A fourth aspect of the present invention is summarized as a multi-carrier transmitting method for transmitting a plurality of sub-carriers having a plurality of symbol durations comprising: spreading and transmitting symbols over the symbol durations in a plurality of sub-carriers, using sub-carrier spreading factor assigned in the direction of the sub-carriers and time-base spreading factor assigned in the direction of the time base; and changing the sub-carrier spreading factor or the time-base spreading factor, based on the condition of a propagation path between the transmitter and a receiver for multi-carrier transmission.

In the multi-carrier transmitting method, the sub-carrier spreading factor or the time-base spreading factor is preferably changed when a radio channel is set up between the transmitter and the receiver.

In the multi-carrier transmitting method, the sub-carrier spreading factor or the time-base spreading factor is preferably changed, following a change in the condition of the propagation path.

BRIEF DESCRIPTION OF THE SEVERAL VIEWS OF THE DRAWINGS

FIG. 4 is a diagram exemplifying a method wherein the pilot symbol allocating unit of the transmitter for multi-carrier transmission according to the first embodiment of the present invention allocates the orthogonal pilot channels.

FIG. 5 is a diagram exemplifying the orthogonal pilot channels allocated by the pilot symbol allocating unit of the transmitter for multi-carrier transmission according to the first embodiment of the present invention.

FIG. 14 is a flowchart illustrating the operation of the transmitter for multi-carrier transmission according to the fifth embodiment of the present invention.

DETAILED DESCRIPTION OF THE INVENTION

The First Embodiment of the Present Invention

Referring to FIGS. 4 to 5, the first embodiment of the present invention will be described.

Figure 1:
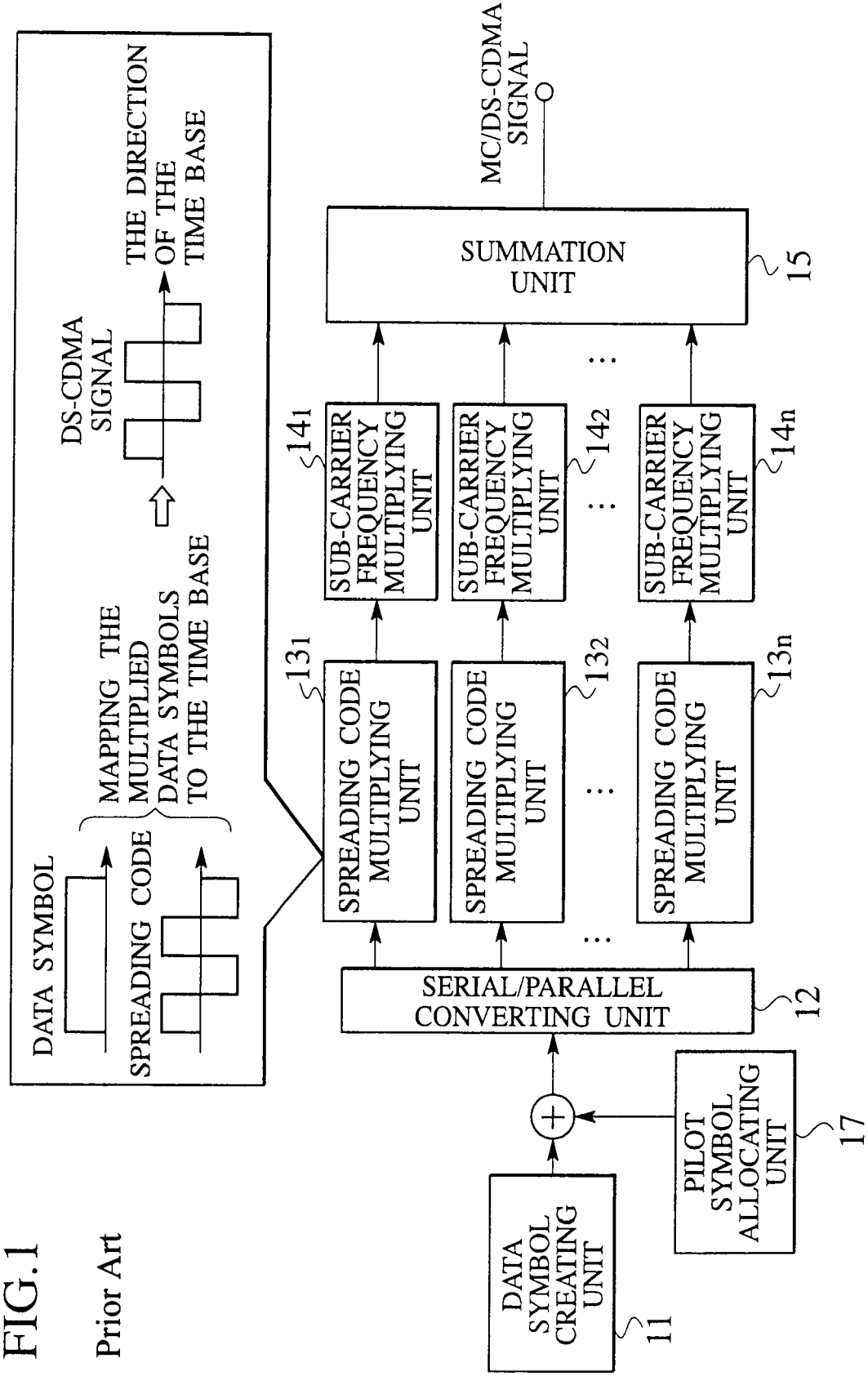
FIG. 1 is a diagram of the schematic configuration of a transmitter for MC/DS-CDMA transmission according to the prior art.
Figure 2:
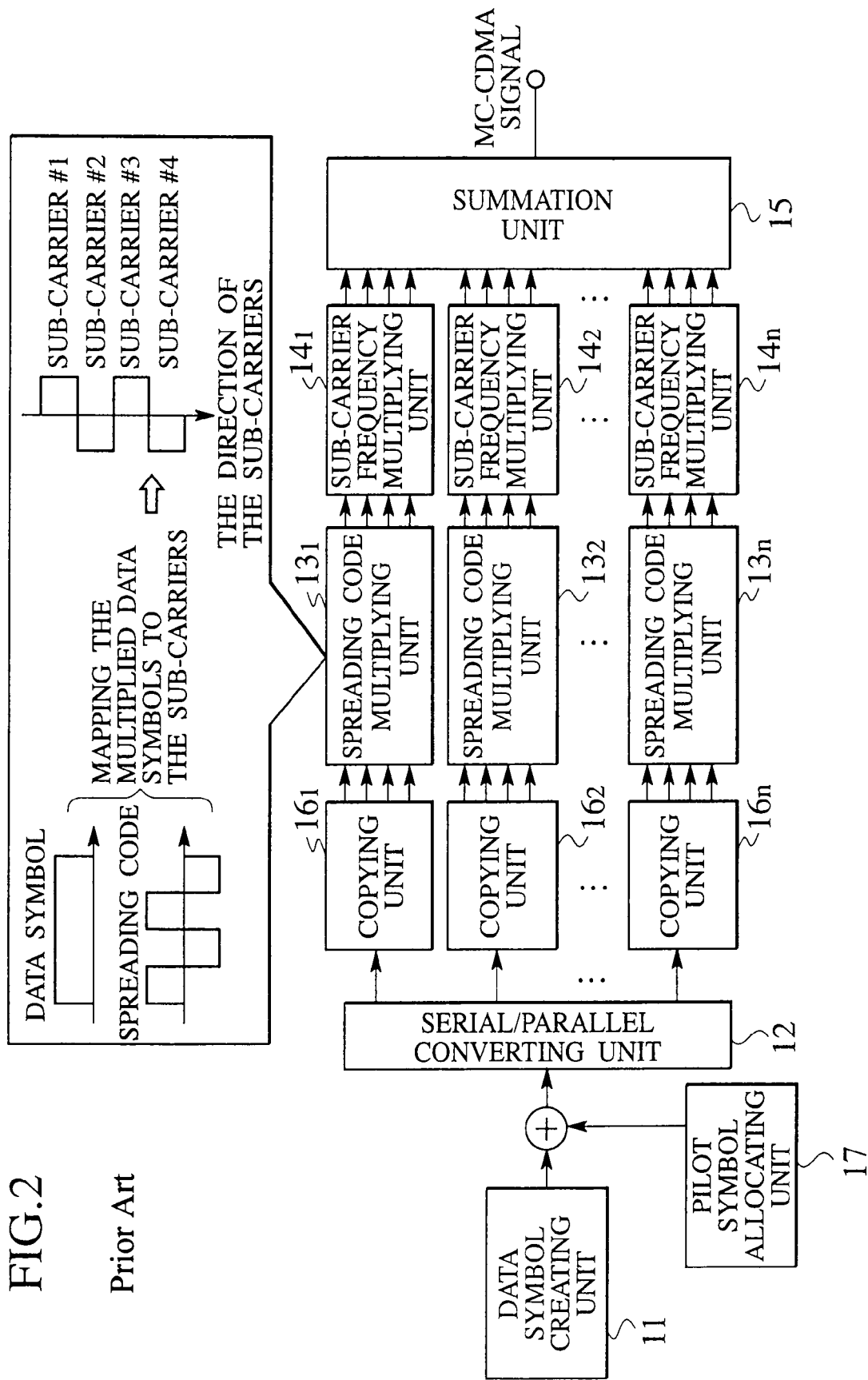
FIG. 2 is a diagram of the schematic configuration of a transmitter for MC-CDMA transmission according to the prior art.
Figure 3:
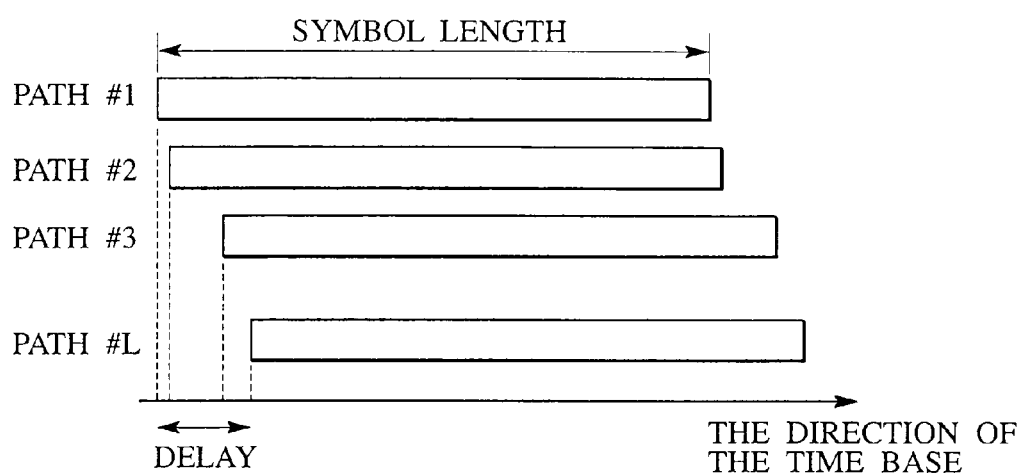
FIG. 3 is a diagram explaining the reason why the influence of interference caused by the multi-path path propagation is reduced in the multi-carrier transmission according to the prior art.

The configuration of the transmitter for multi-carrier transmission according to the first embodiment is the same as the configuration of the transmitter for multi-carrier transmission according to the prior art shown in FIGS. 1 to 2, except for the method wherein the pilot symbol allocating unit 17 allocates pilot symbol patterns.

As shown in FIG. 4, the transmitter for multi-carrier transmission according to the first embodiment transmits radio frames consisting of at least one pilot symbol duration over a plurality of sub-carriers #1 to #8.

In the description, a "pilot symbol" refers to one bit information taking on values "+1" or "−1", and a "pilot symbol pattern" refers to information consisting of a plurality of the pilot symbols. As shown in FIG. 5, for example, the pilot symbol pattern includes a pilot symbol pattern #1 "+1, +1, +1, +1, +1, +1, +1, +1" and so on. The pilot symbol pattern can have any length of symbol durations. For example, the pilot symbol pattern #1 has eight symbol durations.

In the description, the word "orthogonal" means that a value calculated by multiplying pilot symbols which correspond with each other between two pilot symbol patterns and summing the multiplied results is "0". In FIG. 5, for example, the pilot symbol pattern #1 "+1, +1, +1, +1, +1, +1, +1, +1" is "orthogonal" to the pilot symbol pattern #2 "+1, −1, +1, −1, +1, −1, +1, −1". In the description, the "orthogonal pilot symbol patterns" refer to the pilot symbol patterns which are orthogonal to each other.

In FIG. 4, pilot symbol durations in which the pilot symbols can be multiplexed in the direction of the time base have a length of 4 symbol durations.

In FIG. 4, a pilot symbol allocating unit 17 can allocate pilot symbols to the pilot symbol durations, and allocate data symbols to data symbol durations.

There are pilot symbol durations having a length of only 4 symbol durations in each radio frame, so that the pilot symbol allocating unit 17 according to the prior art can multiplex only pilot symbol patterns having a length of 4 symbol durations over the radio frame as orthogonal pilot symbol patterns, and can not allocate more than 4 types of pilot symbol patterns.

On the other hand, the pilot symbol allocating unit 17 according to the first embodiment can allocate a plurality of orthogonal pilot symbol patterns to the pilot symbol durations in a plurality of sub-carriers (for example, 2 sub-carriers), so that the pilot symbol allocating unit 17 according to the first embodiment can allocate the orthogonal pilot symbol patterns having a length of 8 symbol durations when there are pilot symbol durations having a length of 4 symbol durations, and can allocate 8 types of orthogonal pilot symbol patterns at the maximum.

Especially, in a case where base stations apply a directional beam transmission using a plurality of antennas to each mobile station in cellular systems, dedicated pilot channels (pilot symbol patterns) are required for every mobile station. Therefore, according to the first embodiment, there is an advantage in that the number of multiplexed orthogonal pilot symbol patterns can be increased and the number of radio channels between the base stations and the mobile stations can be increased.

FIG. 4 illustrates an example of the orthogonal pilot symbol patterns having 8 symbol durations allocated to the pilot symbol durations in two sub-carriers repeatedly.

According to the first embodiment, the orthogonal pilot symbol patterns are allocated to pilot symbol durations in a plurality of sub-carriers #1 to #8, and the length of the orthogonal pilot symbol patterns becomes longer, so as to allow an increase in the number of orthogonal pilot symbol patterns which can be multiplexed.

In a case where the orthogonal pilot symbol patterns are allocated over a plurality of sub-carriers #1 to #8, a correlation between changes in the condition of the propagation paths in the sub-carriers #1 to #8 needs to be large, so as to reduce the collapse of the orthogonality between the pilot channels received at the receiver for multi-carrier transmission. In multi-carrier transmission systems using a plurality of sub-carriers, a correlation between changes of the condition of the propagation paths in the adjacent sub-carriers is large, so as to reduce the influence of the collapse of the orthogonality between the pilot channels.

Therefore, according to the first embodiment, it is possible to multiplex the orthogonal pilot symbol patterns to radio frames, so as to reduce the influence of the interference caused by pilot symbol patterns in the radio frames.

Moreover, according to the first embodiment, the pilot symbol allocating unit 17 allocates a plurality of pilot symbol patterns to the pilot symbol durations in a plurality of sub-carriers, so as to make the length of the pilot symbol patterns which can be multiplexed longer, increase the number of the pilot symbol patterns which can be multiplexed, and increase the number of radio channels which can be set up between the transmitter and the receiver, when the number of the pilot symbol durations in each sub-carrier is limited.

FIG. 5 illustrates an example of the orthogonal pilot symbol patterns having a length of 8 symbol durations (4 symbol durations×2 sub-carriers) allocated by the pilot symbol allocating unit 17 according to the first embodiment.

FIG. 5 illustrates 8 types of orthogonal pilot symbol patterns #1 to #8. The pilot symbol allocating unit 17 according to the first embodiment can multiplex 8 types of orthogonal pilot symbol patterns #1 to #8 over 8 pilot symbol durations in the sub-carriers #i to #i+1.

The Second Embodiment of the Present Invention

Figure 6:
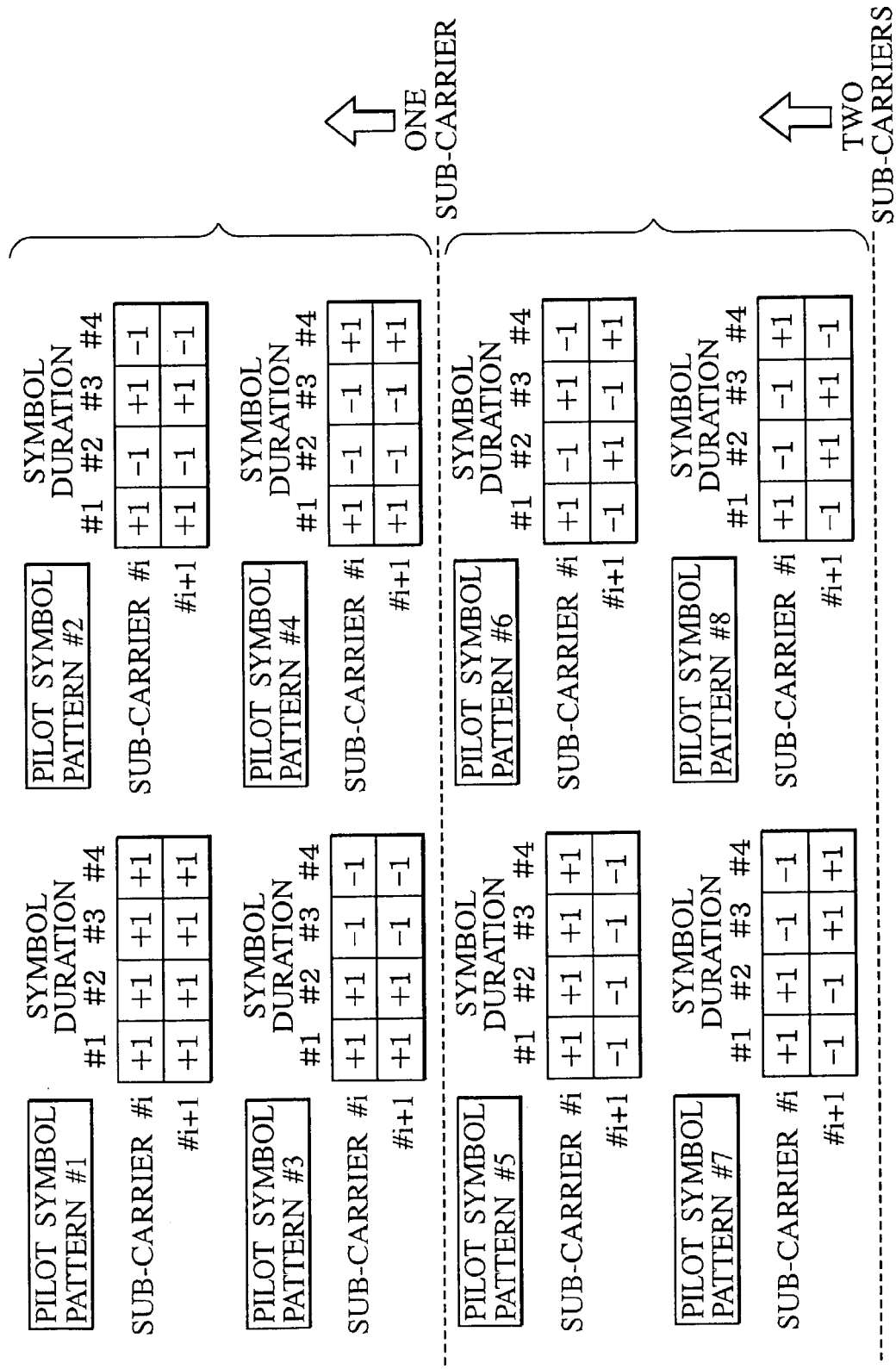
FIG. 6 is a diagram exemplifying the orthogonal pilot channels allocated by the pilot symbol allocating unit of the transmitter for multi-carrier transmission according to the second embodiment of the present invention.
Figure 7:
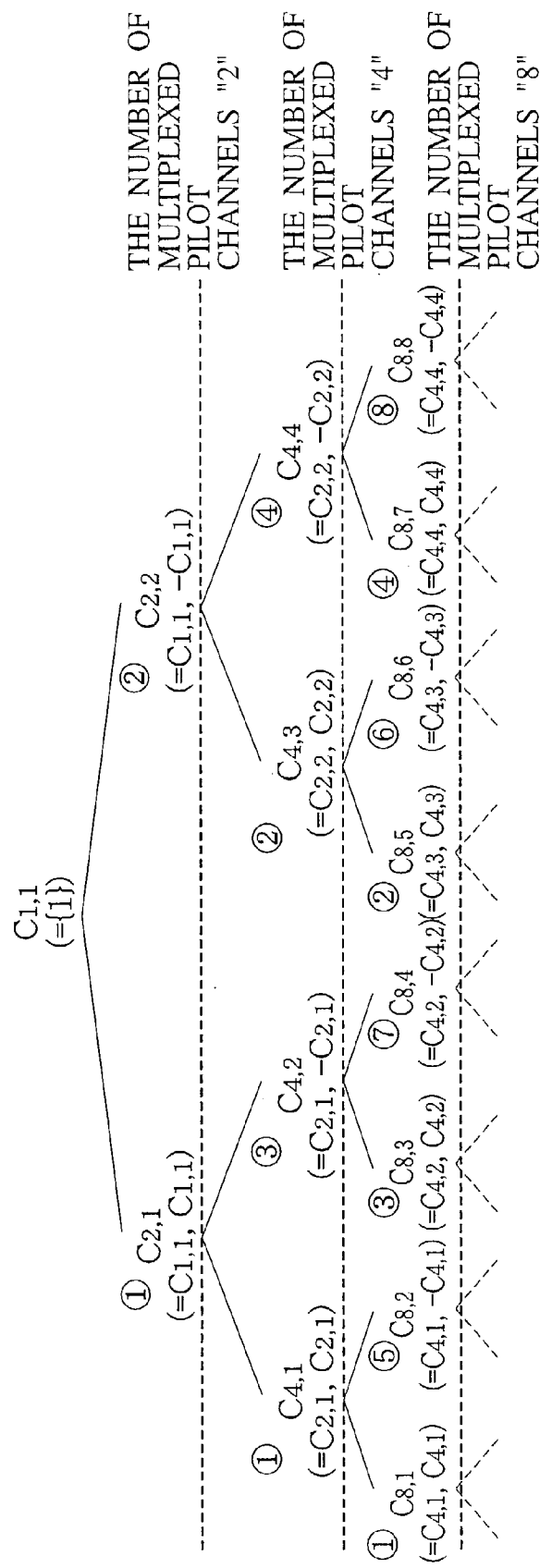
FIG. 7 is a diagram exemplifying OVSF codes which belong to the orthogonal pilot channels allocated by the pilot symbol allocating unit of the transmitter for multi-carrier transmission according to the second embodiment of the present invention.

Referring to FIGS. 6 and 7, the second embodiment of the present invention will be described. The configuration of the transmitter for multi-carrier transmission according to the second embodiment is the same as the configuration of the transmitter for multi-carrier transmission according to the first embodiment.

In the second embodiment, there are pilot symbol durations having a length of 4 symbol durations in each sub-carrier #1 to #8, the orthogonal pilot symbol patterns to be allocated are the same as the orthogonal pilot symbol patterns in the first embodiment.

The pilot symbol allocating unit 17 according to the second embodiment can change the length of a pilot symbol pattern based on the number of the pilot symbol patterns which are allocated.

To be concrete, the pilot symbol allocating unit 17 can allocate the orthogonal pilot symbol patterns #1 to #8 having a length of 4 or 8 symbol durations to 1 or 2 sub-carrier(s) #i to #i+1 in the predetermined order, as shown in FIG. 6.

As shown in FIG. 6, the pilot symbol allocating unit 17 can orthogonalize the pilot symbol patterns in 4 symbol durations over 1 sub-carrier #I or #i+1 using the pilot symbol patterns #1 to #4, when the number of multiplexed pilot channels (pilot symbol patterns) is the same as or less than 4.

On the other hand, the pilot symbol allocating unit 17 can orthogonalize the pilot symbol patterns in 8 symbol durations over 2 sub-carriers #i and #i+1 by adding the pilot symbol patterns #5 to #8 to the pilot symbol patterns #1 to #4, when the number of multiplexed pilot channels (pilot symbol patterns) is the same as or less than 8.

FIG. 7 illustrates the Orthogonal Variable Spreading Factor (OVSF) codes as a general example of the orthogonal pilot symbol patterns. The OVSF codes are described in "Koichi Okawa and Fumiyuki Adachi, Orthogonal forward link using orthogonal multi-spreading factor codes for coherent DS-CDMA mobile ratio, IEICE Transactions on Communications, vol. E81-B, no. 4, pp. 777-784, April 1998".

The pilot symbol allocating unit 17 according to the second embodiment can orthogonalize a few multiplexed pilot channels to each other using a few sub-carriers, by selecting the orthogonal pilot symbol patterns to be allocated, based on the hierarchy of the OVSF codes as shown in FIG. 7, and based on the number of the multiplexed pilot channels. As the number of multiplexed pilot channels is larger, the pilot symbol allocating unit 17 can orthogonalize the multiplexed pilot channels to each other using more sub-carriers.

The pilot symbol allocating unit 17 can increase the number of multiplexed pilot channels to more than 8, based on the hierarchy of the OVSF codes.

The Third Embodiment of the Present Invention

Figure 8:
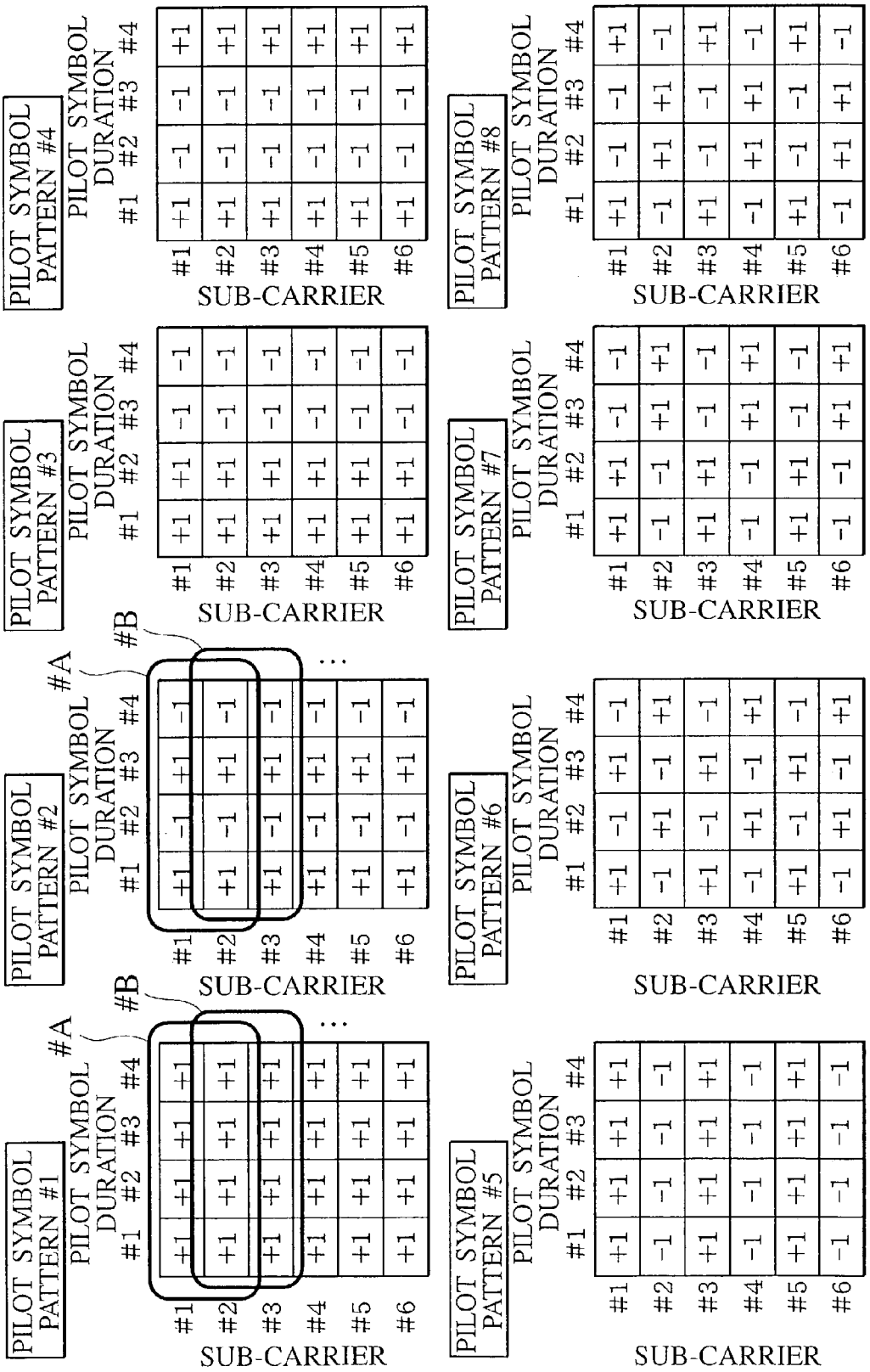
FIG. 8 is a diagram exemplifying a method wherein the pilot symbol allocating unit of the transmitter for multi-carrier transmission according to the third embodiment of the present invention allocates the orthogonal pilot channels.

Referring to FIG. 8, the third embodiment of the present invention will be described. The configuration of the transmitter for multi-carrier transmission according to the third embodiment is the same as the configuration of the transmitter for multi-carrier transmission according to the first embodiment.

As shown in FIG. 8, the pilot symbol allocating unit 17 of the transmitter for multi-carrier transmission according to the third embodiment allocates the pilot symbol patterns #1 to #8 shown in FIG. 5, to any given portion in the pilot symbol durations in at least two sub-carriers among the sub-carriers #1 to #6.

In FIG. 8, the pilot symbol allocating unit 17 is configured to allocate the pilot symbol patterns #1 to #8 shown in FIG. 5, to the pilot symbol durations in predetermined numbers (for example, two) of consecutive sub-carriers.

The pilot symbol patterns #1 to #8 which are allocated to the same portions #A and #B are orthogonal to each other.

The portion #A consists of the pilot symbol durations #1 to #4 in the sub-carrier #1 and the pilot symbol durations #1 to #4 in the sub-carrier #2 which is consecutive to the sub-carrier #1.

The portion #B consists of the pilot symbol durations #1 to #4 in the sub-carrier #2 and the pilot symbol durations #1 to #4 in the sub-carrier #3 which is consecutive to the sub-carrier #2.

That is to say, both portions #A and #B consist of 4 symbol durations in the direction of the time base and 2 symbol durations in the direction of the sub-carriers.

As shown in FIG. 8, for example, the pilot symbol pattern #1 "+1, +1, +1, +1, +1, +1 +1, +1" which is allocated to the portion #A (or #B) and the pilot symbol pattern #2 "+1, −1, +1, −1, +1, −1 +1, −1" which is allocated to the portion #A (or #B) are orthogonal to each other.

According to the third embodiment, it is possible to orthogonalize any two sub-carriers, so as to allow an estimation of the changes of the propagation paths in each sub-carrier.

The Fourth Embodiment of the Present Invention

Figure 9:
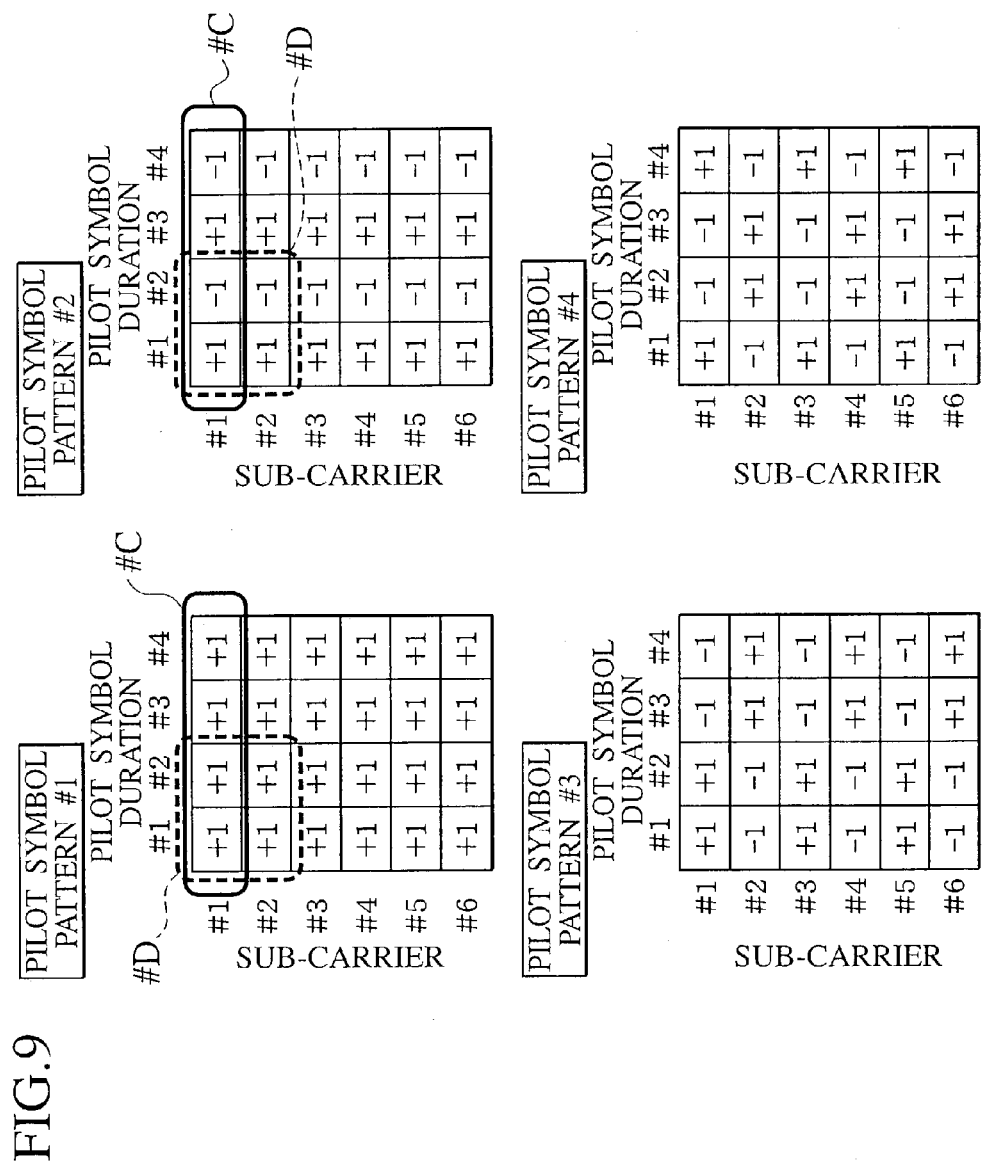
FIG. 9 is a diagram exemplifying a method wherein the pilot symbol allocating unit of the transmitter for multi-carrier transmission according to the fourth embodiment of the present invention allocates the orthogonal pilot channels.
Figure 10:
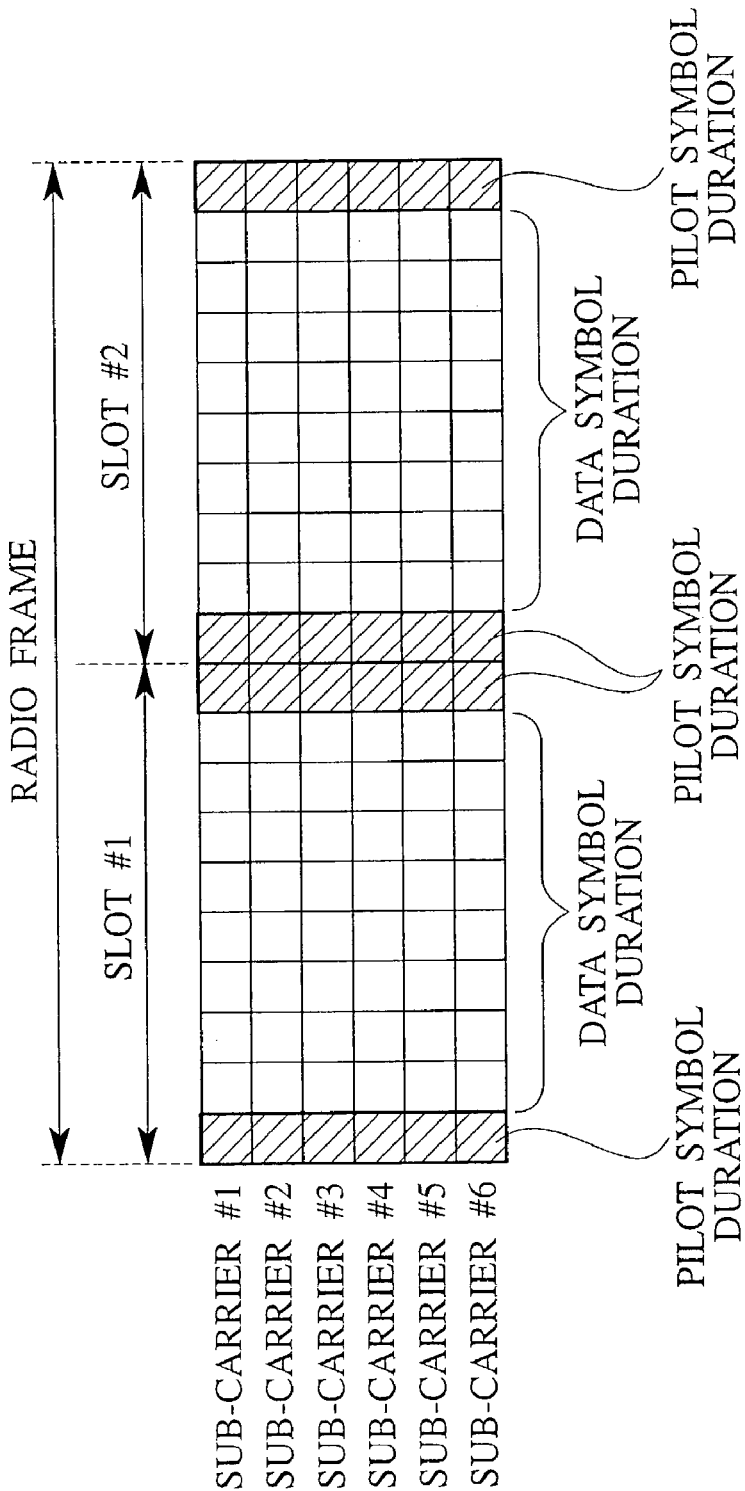
FIG. 10 is a diagram exemplifying the method for allocating the orthogonal pilot channels to radio frames consisting of two slots according to the fourth embodiment of the present invention.

Referring to FIGS. 9 and 10, the fourth embodiment of the present invention will be described. The configuration of the transmitter for multi-carrier transmission according to the fourth embodiment is the same as the configuration of the transmitter for multi-carrier transmission according to the first embodiment.

As shown in FIG. 9, the pilot symbol allocating unit 17 of the transmitter for multi-carrier transmission according to the fourth embodiment allocates the pilot symbol patterns #1 to #4 shown in FIG. 6, to any given portion (for example, #D) in the pilot symbol durations in at least two sub-carriers among the sub-carriers #1 to #6.

In FIG. 9, the pilot symbol allocating unit 17 is configured to allocate the pilot symbol patterns #1 to #4 to the portion #C and #D in the pilot symbol durations.

The pilot symbol patterns #1 to #4 which are allocated to the same portion #C and #D are orthogonal to each other.

The portion #C consists of the pilot symbol durations #1 to #4 in the sub-carrier #1. That is to say, the portion #C consists of 4 symbol durations in the direction of the time base and 1 symbol duration in the direction of the sub-carriers.

The portion #D consists of the pilot symbol durations #1 to #2 in the sub-carrier #1 and the pilot symbol durations #1 to #2 in the sub-carrier #2 which is consecutive to the sub-carrier #1. That is to say, the portion #D consists of 2 symbol durations in the direction of the time base and 2 symbol durations in the direction of the sub-carriers.

As shown in FIG. 9, for example, the pilot symbol pattern #1 "+1, +1, +1, +1" which is allocated to the portion #C (or #D) and the pilot symbol pattern #2 "+1, −1, +1, −1, +1, −1 +1, −1" which is allocated to the portion #C (or #D) are orthogonal to each other.

In the fourth embodiment, the pilot symbol allocating unit 17 can allocate the pilot symbol patterns #1 to #4, so as to orthogonalize any two pilot symbol patterns using the 4 symbol durations in the direction of the time base, and orthogonalize any two pilot symbol patterns using the 2 symbol durations in the direction of the time base and using the 2 symbol durations in the direction of the sub-carriers, as shown in FIG. 9.

According to the fourth embodiment, it is possible to orthogonalize any two pilot symbol patterns using the 4 symbol durations in the direction of the time base in radio frames, and orthogonalize any two pilot symbol patterns using the 2 symbol durations in the direction of the time base and in the 2 symbol durations in the direction of the sub-carriers, when the radio frames include two slots and two pilot channels are multiplexed in each slot, as shown in FIG. 10. Therefore, the orthogonal pilot symbol patterns which are the same as or less than 4 can be used in the example of FIG. 10.

The Fifth Embodiment of the Present Invention

Figure 11:
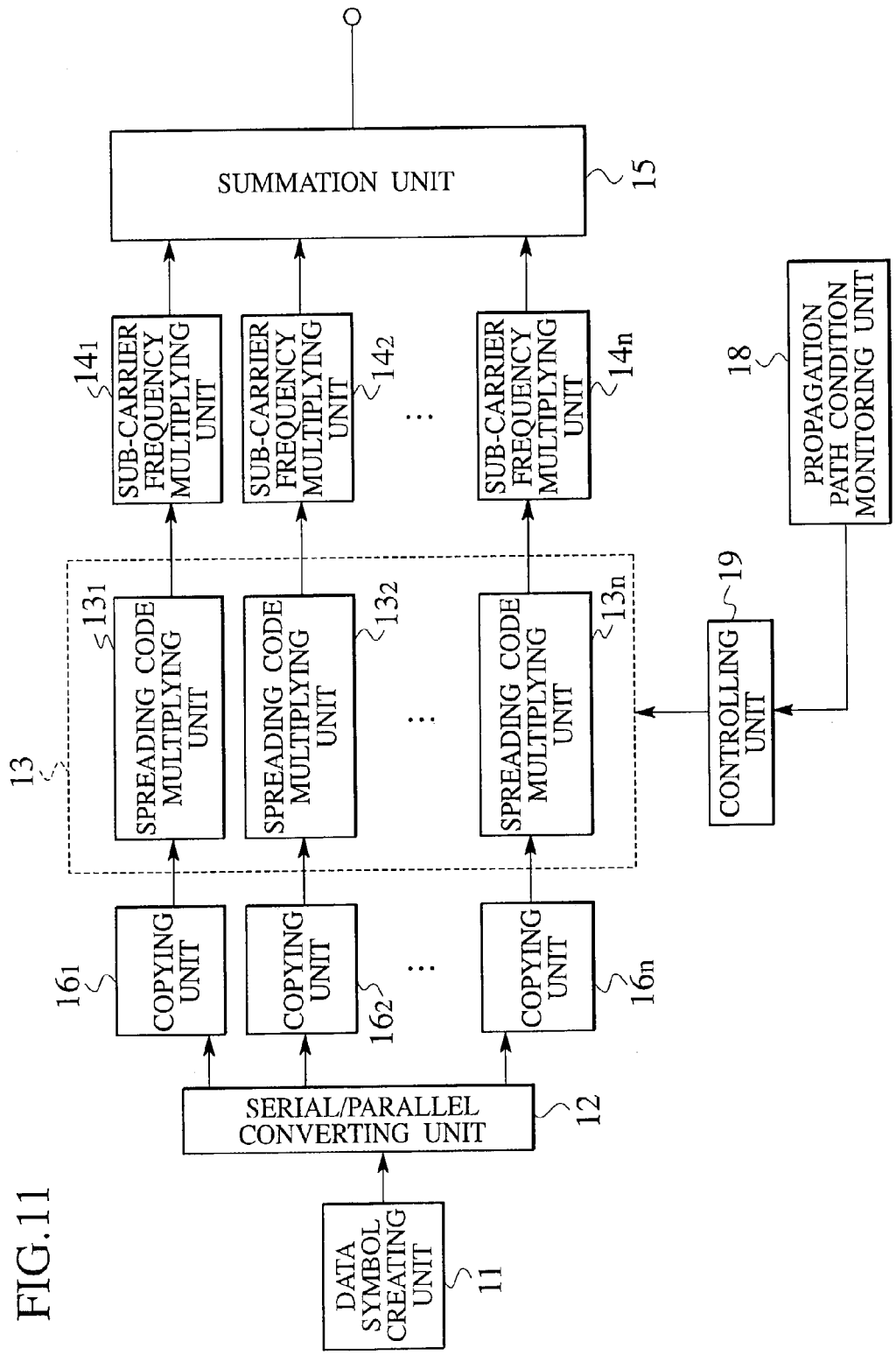
FIG. 11 is a diagram of the schematic configuration of a transmitter for multi-carrier transmission according to the fifth embodiment of the present invention.

Referring to FIGS. 11 to 14, the fifth embodiment of the present invention will be described. FIG. 11 illustrates the schematic configuration of a transmitter for multi-carrier transmission according to the fifth embodiment. The transmitter for multi-carrier transmission transmits the radio frames having a plurality of symbol durations, using a plurality of sub-carriers.

As shown in FIG. 11, the transmitter for multi-carrier transmission comprises a data symbol creating unit 11, a serial/parallel converting unit 12, spreading code multiplying units $13_1$ to $13_n$, sub-carrier frequency multiplying units $14_1$ to $14_n$, a summation unit 15, copying units $16_1$ to $16_n$, a propagation path condition monitoring unit 18 and a controlling unit 19.

Mainly, the configuration of the transmitter for multi-carrier transmission according to the fifth embodiment which is different from the transmitter according to the first to fourth embodiments will be described.

The spreading code multiplying units $13_1$ to $13_n$ spread symbols (data symbols) to be transmitted over the symbol durations in a plurality of sub-carriers, using sub-carrier spreading factor assigned in the direction of the sub-carriers and time-base spreading factor assigned in the direction of the time base.

Figure 12:
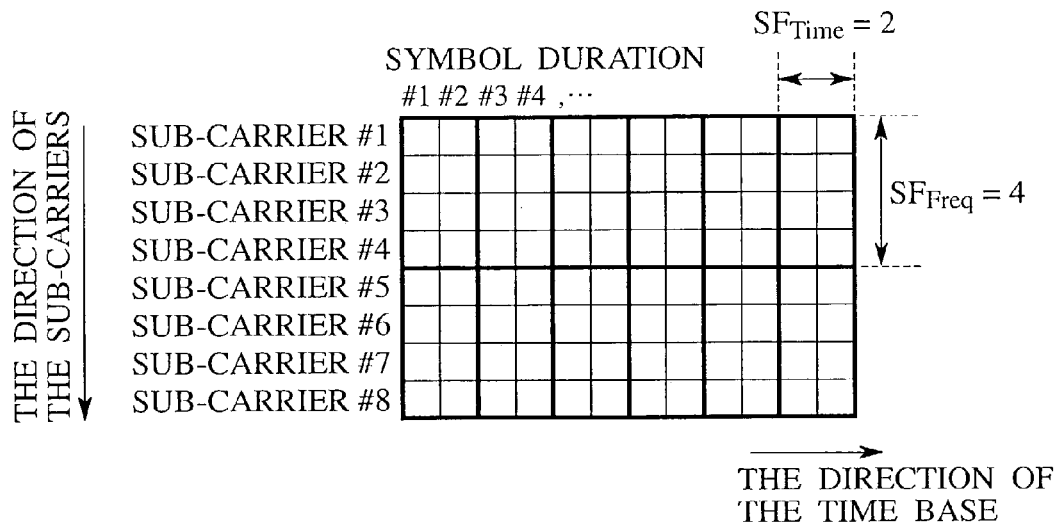
FIG. 12 is a diagram explaining a method wherein the transmitter for multi-carrier transmission according to the fifth embodiment of the present invention spreads data symbols.

As shown in FIG. 12, the spreading code multiplying units $13_1$ to $13_n$ spread data symbols using the sub-carrier spreading factor ($SF_{time}=2$) and the time-base spreading factor ($SF_{Freq}=4$).

The spreading code multiplying units $13_1$ to $13_n$ can multiplex a plurality of channels using a plurality of spreading codes each of which has a different symbol pattern when the radio channels are configured by spreading the symbols two-dimensionally.

The propagation path condition monitoring unit 18 monitors the condition of the propagation path, that is to say, the condition of the radio channel between the transmitter for multi-carrier transmission and the receiver for multi-carrier transmission.

The controlling unit 19 is configured to change the sub-carrier spreading factor $SF_{Freq}$ and/or the time-base spreading factor $SF_{time}$, based on the condition of the propagation path, that is to say, the condition of the radio channel between the transmitter and the receiver.

The controlling unit 19 can change the sub-carrier spreading factor $SF_{Freq}$ and/or the time-base spreading factor $SF_{time}$, when the radio channel is set up between the transmitter and the receiver.

The controlling unit 19 can change the sub-carrier spreading factor $SF_{Freq}$ and/or the time-base spreading factor $SF_{time}$, following a change in the condition of the propagation path.

When the symbol patterns of the spreading codes which are used by the spreading code multiplying units $13_1$ to $13_n$ are orthogonal to each other, the orthogonality of the multiplexed radio channels is kept in the transmitter. However, the spread symbols are influenced by the change in phases and/or amplitudes in the propagation paths, so that the orthogonality of the multiplexed radio channels collapses, interference among the radio channels occurs and the receiving quality is degraded in the receiver.

The phase and/or the amplitude of the symbols in the direction of the time base are changed according to the maximum Doppler frequency in the propagation path. The phase and/or the amplitude of the symbols in the direction of the sub-carriers are changed according to the delay spread in the propagation path.

Therefore, it is efficient for the controlling unit 19 to set up the sub-carrier spreading factor $SF_{Freq}$ and/or the time-base spreading factor $SF_{time}$ flexibly within the range wherein the radio channels are orthogonal to each other based on the maximum Doppler frequency and/or the delay spread, so as to reduce the collapse of the orthogonality, which is caused by the change in the condition of the propagation path, between the multiplexed radio channels.

For example, it is efficient for the controlling unit 19 to set up the maximum $SF_{time}$ which satisfies the condition "$SF_{time}<1/f_D$", so as to keep the orthogonality between the radio channels multiplexed with $SF_{time}$, against the change in phase and/or amplitude of symbols in the direction of the time base according to the maximum Doppler frequency $f_D$.

Moreover, it is efficient for the controlling unit 19 to set up the maximum $SF_{Freq}$ which satisfies the condition "$SF_{Freq}<1/\tau$", so as to keep the orthogonality between the radio channels multiplexed with $SF_{Freq}$, against the change in phase and/or amplitude of symbols in the direction of the sub-carriers according to the delay spread $\tau$.

The $SF_{time}$ and $SF_{Freq}$ are defined as the maximum spread ratio satisfying the above conditions. However, the $SF_{time}$ and $SF_{Freq}$ are not limited to the spread ratio, and may be set up by other methods for reducing the interference from other cells in the cellular system.

According to the fifth embodiment, it is possible to transmit data symbols with high quality, by reducing the influence of the interference caused by the collapse of the orthogonality between radio channels, which is influenced by the change in the condition of the propagation paths in the symbols in the direction of the time base or the sub-carriers.

Figure 13:
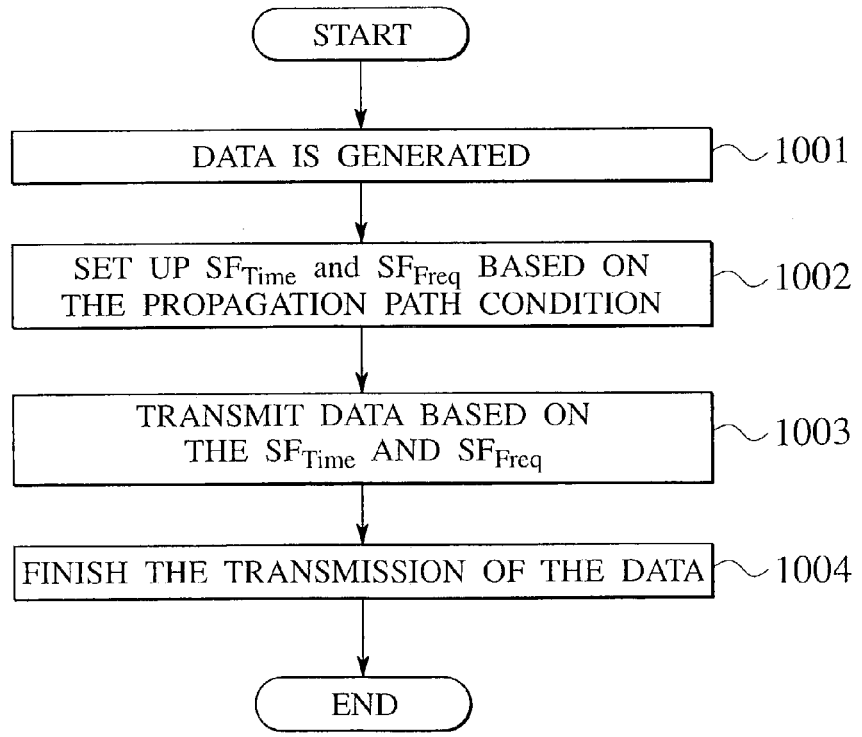
FIG. 13 is a flowchart illustrating the operation of the transmitter for multi-carrier transmission according to the fifth embodiment of the present invention.

FIGS. 13 and 14 are flowcharts showing the operations of the transmitter for multi-carrier transmission according to the fifth embodiment.

FIG. 13 shows the flowchart in the case where the controlling unit 19 changes the sub-carrier spreading factor $SF_{Freq}$ and/or the time-base spreading factor $SF_{time}$, when the radio channels are set up between the transmitter and the receiver.

FIG. 14 shows the flowchart in the case where the controlling unit 19 changes the sub-carrier spreading factor $SF_{Freq}$ and/or the time-base spreading factor $SF_{time}$, following the change in the condition of the propagation path.

First, referring to FIG. 13, the operation of the transmitter for multi-carrier transmission will be described.

As shown in FIG. 13, in step 1001, data symbols to be transmitted to the receiver for multi-carrier transmission are generated.

In step 1002, the controlling unit 19 determines the time-base spreading factor $SF_{time}$ and the sub-carrier spreading factor $SF_{Freq}$, based on the condition of the propagation path between the transmitter and the receiver, before transmitting the data symbols.

In step 1003, the spreading code multiplying units $13_1$ to $13_n$ spread the data symbols using the time-base spreading factor $SF_{time}$ and the sub-carrier spreading factor $SF_{Freq}$, and the sub-carrier frequency multiplying units $14_1$ to $14_n$ and the summation unit 15 transmit the spread data symbols to the receiver. In step 1004, the transmission of the data symbols is completed.

In an environment where the condition of the propagation path between the transmitter and the receiver is not changed frequently, the controlling unit 19 can follow the change of the propagation path by setting up the time-base spreading factor $SF_{time}$ and the sub-carrier spreading factor $SF_{Freq}$ each time the data symbols are transmitted. Therefore, the operation shown in FIG. 13 is suitable to the above environment.

Second, referring to FIG. 14, the operation of the transmitter for multi-carrier transmission will be described.

As shown in FIG. 14, in step 1101, data symbols to be transmitted to the receiver for multi-carrier transmission are generated.

In step 1102, the controlling unit 19 determines the time-base spreading factor $SF_{time}$ and the sub-carrier spreading factor $SF_{Freq}$, based on the condition of the propagation path between the transmitter and the receiver, before transmitting the data symbols.

In step 1103, the spreading code multiplying units $13_1$ to $13_n$ spread the data symbols using the time-base spreading factor $SF_{time}$ and the sub-carrier spreading factor $SF_{Freq}$, and the sub-carrier frequency multiplying units $14_1$ to $14_n$ and the summation unit 15 transmit the spread data symbols to the receiver.

In step 1104, the controlling unit 19 changes the time-base spreading factor $SF_{time}$ and the sub-carrier spreading factor $SF_{Freq}$, following the change in the condition of the propagation path between the transmitter and the receiver.

Then, the spreading code multiplying units $13_1$ to $13_n$ spread the data symbols using the updated time-base spreading factor $SF_{time}$ and the updated sub-carrier spreading factor $SF_{Freq}$, and the sub-carrier frequency multiplying units $14_1$ to $14_n$ and the summation unit 15 transmit the spread data symbols to the receiver. In step 1105, the transmission of the data symbols is completed.

According to the method shown in FIG. 14, it is possible to set up the proper $SF_{time}$ and $SF_{Freq}$ following the change in the condition of the propagation path, in an environment where the condition of the propagation path between the transmitter and the receiver is changed frequently, such as an environment where the receiver moves fast, so as to transmit the data symbols with high quality.

In the above embodiment, the number of the sub-carriers and the symbol durations are written concretely, but the present invention is not limited to configurations using these numbers of sub-carriers and symbol durations.

The present invention can be applied to the configuration using m pilot symbol durations in n sub-carriers which is determined based on the length of the pilot symbol patterns to be allocated, in consideration of interference with other pilot channels in a like manner to the above embodiment. Here, "m" and "n" are positive integers, the same as, or more than 1.

The transmitter for multi-carrier transmission according to the present invention can determine "m" and "n" in such a manner that the "m" and "n" are squares or higher powers of 2, and the multiplied result of "n" by "m" has the length of the pilot symbol pattern, when the OVSF codes are used.

The transmitter for multi-carrier transmission according to the present invention does not need to be configured with "m" and "n" which are squares or higher powers of 2, when other codes are used.

(The Functions and Effects of the Present Invention)

According to the present invention, it is possible to provide a transmitter for multi-carrier transmission and a multi-carrier transmitting method which allow the allocation of pilot symbol patterns in consideration of interference with other pilot channels to the radio frames.

According to the present invention, it is possible to provide a transmitter for multi-carrier transmission and a multi-carrier transmitting method which allow the control of the spread method in consideration of the condition of the propagation path between the transmitter for multi-carrier transmission and the receiver for multi-carrier transmission.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents.

What is claimed is:

1. A transmitter for multi-carrier transmission configured to transmit a plurality of sub-carriers having at least one pilot symbol duration comprising:

a pilot symbol allocater configured to allocate a first pilot symbol pattern to a first portion and allocate a second pilot symbol pattern to a second portion, the first symbol pattern and the second symbol pattern each constituting a plurality of pilot symbols consecutive in a direction of a time-base and being orthogonal to one another, wherein the first portion and the second portion each include at least two pilot symbol durations in at least two consecutive sub-carriers and only include the plurality of pilot symbols constituting a single pilot symbol pattern, the second portion includes at least two pilot symbol durations in a sub-carrier included in the first portion and a sub-carrier not included in the first portion, the first portion and the second portion share at least one sub-carrier and at least one pilot symbol duration, and the pilot symbol allocater changes the length of at least one of the first and second pilot symbol patterns based on the number of the pilot symbol patterns which are allocated.

2. The transmitter for multi-carrier transmission according to claim 1, wherein the first and second pilot symbol patterns are configured with an Orthogonal Variable Spreading Factor (OVSF) code.

3. The transmitter for multi-carrier transmission according to claim 1, further comprising:

spreaders configured to spread and transmit symbols over the symbol durations in a plurality of sub-carriers, using sub-carrier spreading factor assigned in the direction of the sub-carriers and time-base spreading factor assigned in the direction of the time base; and a controller configured to change the sub-carrier spreading factor or the time-base spreading factor, based on the condition of a propagation path between the transmitter and a receiver for multi-carrier transmission.

4. The transmitter for multi-carrier transmission according to claim 3, wherein the controller changes the sub-carrier spreading factor or the time-base spreading factor when a radio channel is set up between the transmitter and the receiver.

5. The transmitter for multi-carrier transmission according to claim 3, wherein the controller changes the sub-carrier spreading factor or the time-base spreading factor, following a change in the condition of the propagation path.

6. A multi-carrier transmitting method performed by a transmitter for multi-carrier transmission for transmitting a plurality of sub-carriers having at least one pilot symbol duration comprising:

allocating a first pilot symbol pattern to a first portion and allocate a second pilot symbol pattern to a second portion, the first symbol pattern and the second symbol pattern each constituting a plurality of pilot symbols consecutive in a direction of a time-base and being orthogonal to one another, wherein the first portion and the second portion each include at least two pilot symbol durations in at least two consecutive sub-carriers and only include the plurality of pilot symbols constituting a single pilot symbol pattern, the second portion includes at least two pilot symbol durations in a sub-carrier included in the first portion and a sub-carrier not included in the first portion, the first portion and the second portion share at least one sub-carrier and at least one pilot symbol duration, and the length of at least one of the first and second pilot symbol patterns is changed based on the number of the pilot symbol patterns which are allocated.

7. The multi-carrier transmitting method according to claim 6, wherein each of the first and second pilot symbol patterns are configured with an Orthogonal Variable Spreading Factor (OVSF) code.

8. The multi-carrier transmitting method according to claim 6, further comprising:

spreading and transmitting symbols over the symbol durations in a plurality of sub-carriers, using sub-carrier spreading factor assigned in the direction of the sub-carriers and time-base spreading factor assigned in the direction of the time base; and changing the sub-carrier spreading factor or the time-base spreading factor, based on the condition of a propagation path between the transmitter and a receiver for multi-carrier transmission.

9. The multi-carrier transmitting method according to claim 8, wherein the sub-carrier spreading factor or the time-base spreading factor is changed when a radio channel is set up between the transmitter and the receiver.

10. The multi-carrier transmitting method according to claim 8, wherein the sub-carrier spreading factor or the time-base spreading factor is changed following a change in the condition of the propagation path.

* * * * *